(12) United States Patent
Mishra (10) Patent No.: US 10,949,606 B2
(45) Date of Patent: Mar. 16, 2021

(54) SYSTEM AND METHOD FOR LOW-MAINTENANCE CONVERSION OF ADVANCE FUNCTION PRESENTATION FORMAT TO PORTABLE DOCUMENT FORMAT

(71) Applicant: JPMorgan Chase Bank, N.A., New York, NY (US)

(72) Inventor: Abhinav Mishra, Lewis Center, OH (US)

(73) Assignee: JPMORGAN CHASE BANK, N.A., New York, NY (US)

(\*) Notice: Subject to any disclaimer, the term of this patent is extended or adjusted under 35 U.S.C. 154(b) by 0 days.

(21) Appl. No.: 16/460,120

(22) Filed: Jul. 2, 2019

(65) Prior Publication Data

US 2020/0004807 A1 Jan. 2, 2020

Related U.S. Application Data

(60) Provisional application No. 62/692,965, filed on Jul. 2, 2018.

(51) Int. Cl.
| | |
|---|---|
| *G06F 17/00* | (2019.01) |
| *G06F 40/151* | (2020.01) |
| *G06F 40/109* | (2020.01) |
| *G06F 40/117* | (2020.01) |
| *G06F 40/131* | (2020.01) |

(52) U.S. Cl.
CPC .......... *G06F 40/151* (2020.01); *G06F 40/109* (2020.01); *G06F 40/117* (2020.01); *G06F 40/131* (2020.01)

(58) Field of Classification Search
CPC .... G06F 40/151; G06F 40/109; G06F 40/117; G06F 40/131
See application file for complete search history.

(56) References Cited

U.S. PATENT DOCUMENTS

| | | | | |
|---|---|---|---|---|
| 5,375,204 A | * | 12/1994 | Motoyama | G06F 40/20 345/543 |
| 7,016,963 B1 | * | 3/2006 | Judd | H04L 67/42 709/228 |
| 7,500,017 B2 | * | 3/2009 | Cseri | G06F 40/117 709/246 |
| 8,582,164 B2 | * | 11/2013 | Elkady | G06K 15/1815 358/1.18 |

(Continued)

*Primary Examiner* — Laurie A Ries
(74) *Attorney, Agent, or Firm* — Hunton Andrews Kurth LLP (57) ABSTRACT

An embodiment of the present invention is directed to low-maintenance conversion of an advance function presentation (AFP) format to a portable document format. According to an embodiment of the present invention, hidden text may be inserted as locators in the AFP files. For example, the hidden text may be inserted in a small font size (e.g., approximately 1 point) in a color that matches the background, e.g., text in white. A benefit of this hidden text is that it does not need to change with the maintenance of the statement template. Accordingly, the transformation software template may be built, or trained, to look for these hidden text locators to identify the beginning and end of sections. This leads to a robust transformation software template that does not need to be maintained or changed with text changes in the statements.

18 Claims, 4 Drawing Sheets

(56) References Cited

U.S. PATENT DOCUMENTS

| | | | | |
|---|---|---|---|---|
| 9,201,854 | B1* | 12/2015 | Kloiber | G06F 16/93 |
| 2004/0133848 | A1* | 7/2004 | Hunt | G06F 16/9577 |
| | | | | 715/273 |
| 2004/0135805 | A1* | 7/2004 | Gottsacker | G06F 40/103 |
| | | | | 715/751 |
| 2004/0205452 | A1* | 10/2004 | Fitzsimons | G06F 16/958 |
| | | | | 715/255 |
| 2008/0021861 | A1* | 1/2008 | Fitzsimons | G06F 16/958 |
| 2011/0019917 | A1* | 1/2011 | Cantral | G06K 9/2054 |
| | | | | 382/190 |
| 2012/0254730 | A1* | 10/2012 | Sunderland | G06F 40/186 |
| | | | | 715/235 |
| 2013/0128293 | A1* | 5/2013 | Ruehle | G06F 3/1244 |
| | | | | 358/1.13 |
| 2014/0237353 | A1* | 8/2014 | Pirvu | G06F 40/151 |
| | | | | 715/249 |
| 2017/0185569 | A1* | 6/2017 | Gagne-Langevin | G06F 40/177 |
| 2017/0255595 | A1* | 9/2017 | Pirvu | G06F 40/103 |
| 2017/0344547 | A1* | 11/2017 | Smith | G06F 40/131 |
| 2018/0032478 | A1* | 2/2018 | Felderman | G06F 40/131 |
| 2019/0220503 | A1* | 7/2019 | Gelosi | G06F 40/131 |
| 2019/0272128 | A1* | 9/2019 | Koets | G06F 3/1205 |

* cited by examiner

Figure 1

Caab-Return-Namewwwwwwwwwwwwwwwwwwwwwwwwwx
Caab-Return-Addr1Wwwwwwwwwwwwwwwwwwwwwwwwx
Caab-Return-Addr2Wwwwwwwwwwwwwwwwwwwwwwwwx
Caab-Return-Citywwwwwwwwwwwwwwwwwx, OH 12345-1234
Caab-Return-Countrywwwwx I..II..I.I..II..I..I.I....II..I..I..II..I..I..II..I.II.I..I
00000001  001 1610 4417 YYYNNNNNYNN  S 444444449 01 SPCX CAAA-SPEC-HANDLE-DESCwwwwwwwwwwwwwwwwww
2ND CHECK PAID & DAILY BAL ENDING LT 11
CAAA-NAME2wwwwwwwwwwwwwwwwwwwwwwwwwww
CAAA-NAME3wwwwwwwwwwwwwwwwwwwwwwwwwww
CAAA-ADDR1wwwwwwwwwwwwwwwwwwwwwwwwwww
CAAA-ADDR2wwwwwwwwwwwwwwwwwwwwwwwwwww
CAAA-ADDR3wwwwwwwwwwwwwwwwwwwwwwwwwww
CAAA-CITYwwwwwwwwwwwwwwwwwwwwwwwwX OH November 30, 2019 through December 31, 2019
Primary Account: 678901234567891

CUSTOMER SERVICE INFORMATION

| Web site: | Www.Bank.Comwwwww |
| | wwwwwwwwwwwwwwwwwww |
| | wwwwwwwwwwwwwwwwwww |
| | wwwwwx |
| Service Center: | (555) 888-5309 |
| Deaf and Hard of Hearing: | (555) 888-5310 |
| Para Espanol: | (555) 888-5311 |

210 →
*start*card message lines
MSG1-LINE1wwwwwwwwwwwwwwwwwwwwwwwwwwwwwwwwwwwwwwwwwwwwwwwwwwwwwwww
wwwwwwwwwwwwwwwwwwwwwwwwwwwwwwwwwwwwwwwwx
MSG1-LINE2wwwwwwwwwwwwwwwwwwwwwwwwwwwwwwwwwwwwwwwwwwwwwwwwwwwwwwww
wwwwwwwwwwwwwwwwwwwwwwwwwwwwwwwwwwwwwwwwx
MSG1-LINE3wwwwwwwwwwwwwwwwwwwwwwwwwwwwwwwwwwwwwwwwwwwwwwwwwwwwwwww
wwwwwwwwwwwwwwwwwwwwwwwwwwwwwwwwwwwwwwwwx
MSG1-LINE4wwwwwwwwwwwwwwwwwwwwwwwwwwwwwwwwwwwwwwwwwwwwwwwwwwwwwwww
wwwwwwwwwwwwwwwwwwwwwwwwwwwwwwwwwwwwwwwwx
MSG1-LINE5wwwwwwwwwwwwwwwwwwwwwwwwwwwwwwwwwwwwwwwwwwwwwwwwwwwwwwww
wwwwwwwwwwwwwwwwwwwwwwwwwwwwwwwwwwwwwwwwx
*end*card message lines

212 →
*start*consolidated balance summary2

CONSOLIDATED BALANCE SUMMARY

ASSETS

Checking & Savings

| | ACCOUNT | BEGINNING BALANCE THIS PERIOD | ENDING BALANCE THIS PERIOD |
|---|---|---|---|
| Eaaa-Product-Name-Checkingwwwwwwwwwww wwwwwwwwwwwww | 678901234567891 | $111,111.19 | $3,333,333.39 |
| Total | | $666,666.69 | $777,777.79 |

CD & Retirement

| | ACCOUNT | INTEREST RATE/ APY* | MATURITY DATE | BEGINNING BALANCE THIS PERIOD | ENDING BALANCE THIS PERIOD |
|---|---|---|---|---|---|
| Paca-Acct-Descwwwwwwwwwwwwwwwwx Balance plus interest Earned Not Paid $444,444.49 | 000000000000001 | 0.00% 12.35% | 12/30/04 | 1,111,111.19 | 222,222.29 |
| Yaca-Acct-Descwwwwwwwwwwwwwwwwwx Balance plus interest Earned Not Paid $890,123.49 | 000000000000001 | | | 111,111.19 | 222,222.29 |
| Total | | | | $111,111.19 | $222,222.29 |

*The Annual Percentage Yield (APY) for your CD/Retirement CD is calculated using the term and deposit amount as of the issue / renewal date or maintenance effective date. The APY assumes interest will remain on deposit until maturity.

*end*consolidated balance summary2

Figure 2

Output 310

Start 330

End 332

SYSTEM AND METHOD FOR LOW-MAINTENANCE CONVERSION OF ADVANCE FUNCTION PRESENTATION FORMAT TO PORTABLE DOCUMENT FORMAT

CROSS REFERENCE TO RELATED APPLICATIONS

The application claims priority to U.S. Provisional Application 62/692,965, filed Jul. 2, 2018, the contents of which are incorporated herein in its entirety FIELD OF THE INVENTION The invention relates generally to systems and methods for low-maintenance conversion of advance function presentation format to portable document format.

BACKGROUND OF THE INVENTION

Documents, such as bank statements, are often created using a tool such as OpenText™ Exstream, in a highly-structured format such as the AFP (Advance function presentation) format. AFP is an efficient format for high speed printing. The AFP format may also be compressed for archival purposes.

When a customer requests a statement/notice online, the data in the AFP format may be converted to PDF UA (Accessible format of PDF) for presentation to the end customer. Examples of suitable transformation software include the OpenText™ Output Transformation software and MasterONE from Crawford Technologies. Other suitable software that can convert AFP to Accessible PDF (PDF UA) may be used as is necessary and/or desired.

For this transformation to be done efficiently, the software requires the template of the composed AFP document. Specifically, it needs to know: (1) How composed statement/notice was structured (e.g., which section comes after which). For example, sections in statements may include the summary section, activity section etc.; (2) How to locate the beginning and end of a section; and (3) Once a section is located, what to expect inside of it (e.g., a three column table, seven column table, simple text, etc.).

To effectively communicate all the above information to the transformation tool, the statement template may be built in the transformation software as well along with Exstream. The template in the transformation software and in Exstream must be tightly coupled and maintained together.

Because bank statements are dynamic (e.g., changing/adding logos, headers, and messages on the statement), the templates in the transformation software and Exstream must be changed to reflect those changes. With each change in statement text, there is an increased risk of breaking the transformation software template by changing the text that is used as a locator in the transformation software.

These and other drawbacks exist.

SUMMARY OF THE INVENTION

According to one embodiment, the invention relates to a system that implements conversion of advance function presentation format to a portable document format. The system comprises: a memory that stores and manages customer data; a communication interface that communicates with a requestor; and a computer processor, coupled to the memory and communication interface, configured to perform the steps of: generating data in a structured data format; adding one or more sets of text markers in a hidden format, wherein each set of text markers comprise a start marker and an end marker that identifies a section; storing the data with the one or more set of text markers; receiving a request for data in an output format; converting the stored data into the output format by identifying the one or more sets of text makers for generating the output format; and transmitting, via the communication interface, the output format to the requestor in real-time.

According to another embodiment, the invention relates to a method that implements conversion of advance function presentation format to a portable document format. The method comprises the steps of: generating data in a structured data format; adding one or more sets of text markers in a hidden format, wherein each set of text markers comprise a start marker and an end marker that identifies a section; storing, via a memory, the data with the one or more set of text markers; receiving a request for data in an output format; converting the stored data into the output format by identifying the one or more sets of text makers for generating the output format; and transmitting, via a communication interface, the output format to the requestor in real-time.

The system may include a specially programmed computer system comprising one or more computer processors, interactive interfaces, electronic storage devices, and networks. The computer implemented system, method and medium described herein provide unique advantages to customers, financial entities, organizations and other users, according to various embodiments of the invention. An embodiment of the present invention is directed to low-maintenance conversion of an advance function presentation (AFP) format to a portable document format. According to an embodiment of the present invention, hidden text may be inserted as locators in the AFP files. Because the text is small and in the same color as the background, the text may not be visible to an end user. With the use of hidden text, an embodiment of the present invention is not required to maintain and constantly update a statement template. Accordingly, the transformation software template may be programmed to locate hidden text locators to identify the beginning and end of sections. An embodiment of the present invention provides a robust transformation software template that does not need to be maintained or changed with text changes in the statements and/or other outputs.

These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

FIG. 2 illustrates an exemplary illustration, according to an embodiment of the present invention.

DETAILED DESCRIPTION OF PREFERRED EMBODIMENTS

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to low-maintenance conversion of an advance function presentation (AFP) format to a portable document format. According to an embodiment of the present invention, hidden text may be inserted as locators in the AFP files. For example, the hidden text may be inserted in a small font size (e.g., approximately 1 point) in a color that matches the background, e.g., text in white. Because the text is small and in the same color as the background, the text may not be visible to an end user. A benefit of this hidden text is that it does not need to change with the maintenance of the statement template. Accordingly, the transformation software template may be built, or trained, to look for these hidden text locators to identify the beginning and end of sections. This leads to a robust transformation software template that does not need to be maintained or changed with text changes in the statements.

Figure 1:
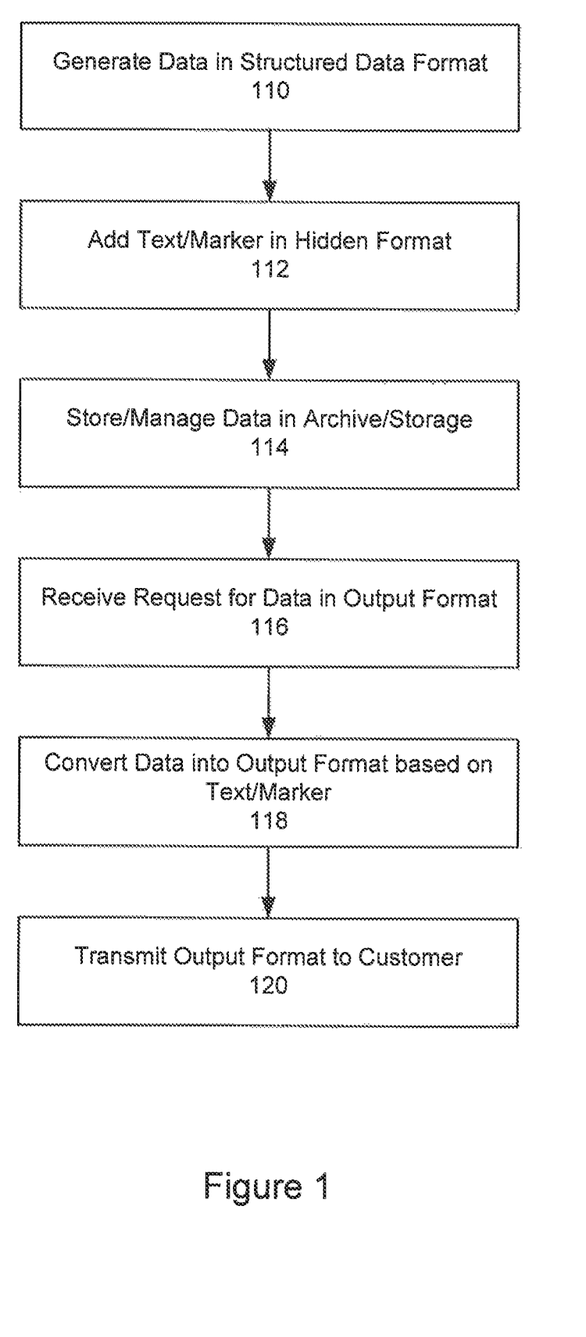
FIG. 1 illustrates an exemplary flowchart of data format conversion, according to an embodiment of the present invention.

FIG. 1 illustrates an exemplary flow chart of data format conversion, according to an embodiment of the present invention. At step 110, data may be generated in a structured data format. At step 112, hidden text or markers may be added. At step 114, the data may be stored and managed in a storage component, such as a database or archive storage. At step 116, a request for data may be received. The data may be requested in a particular output format. At step 118, the data may be converted into the output format based on the text and/or markers in hidden format. At step 120, the output may be generated and then transmitted to the requesting entity or customer. While the process of FIG. 1 illustrates certain steps performed in a particular order, it should be understood that the embodiments of the present invention may be practiced by adding one or more steps to the processes, omitting steps within the processes and/or altering the order in which one or more steps are performed. Additional details for each step are provided below.

At step 110, data may be generated in a structured data format, such as AFP. During the generation, the text may be inserted in a format that may be hidden, or difficult to see (e.g., small font, color matching the background, etc.) into the formatting. In another embodiment, the text may be inserted in a visible format but may be removed during conversion. AFP is one exemplary format; other formats that provide efficient output generation may be applied.

At step 112, hidden text or markers may be added. Text or markers may be in small size and in a color that corresponds to the background. Other variations may be applied so that the text or marker is not readily visible to an end user. For example, text may be used, such as "start" and "end". Other examples may include symbols, code, colors, images, different language, etc.

At step 114, the data may be stored and managed in a storage component, such as a database or archive storage.

At step 116, a request for data may be received. The data may be requested in a particular output format. For example, a customer may request a statement. This may include a credit card statement, bank statement, etc. The output format may also include non-financial documents, such as insurance statements and notices, healthcare statements and notices, utility documents as well as other types of documents.

At step 118, the data in the AFP format may be converted to PDF UA format. According to an embodiment of the present invention, a transformation software template may be used to detect the hidden text that identifies one or more sections, and may apply formatting rules to the data in that section based on the transformation software template. For example, the transformation software template may specify the number of columns, orientation, text color, text size, type of graphics, alternate text for graphics, etc. Conversion to and/or from other formats may be applied. AFP and PDF UA are used for illustrative purposes.

At step 120, the output may be generated and then transmitted to the requesting entity or customer. The generation and transmission to the end user may be performed in real-time or on-the-fly.

FIG. 2 illustrates an exemplary illustration, according to an embodiment of the present invention. FIG. 2 is an exemplary statement with hidden text markers at 210 and 212. In this example, hidden text markers would be in small font (e.g., approximately 1 pt font) and in the same color as the statement background, e.g., white text. The hidden markers 210 and 212 indicate corresponding sections to an output transformation tool. This information may be used to format and customize an output format. According to another example, the hidden text markers (after they are detected) may be removed or otherwise obscured when sent to a recipient.

Figure 3:
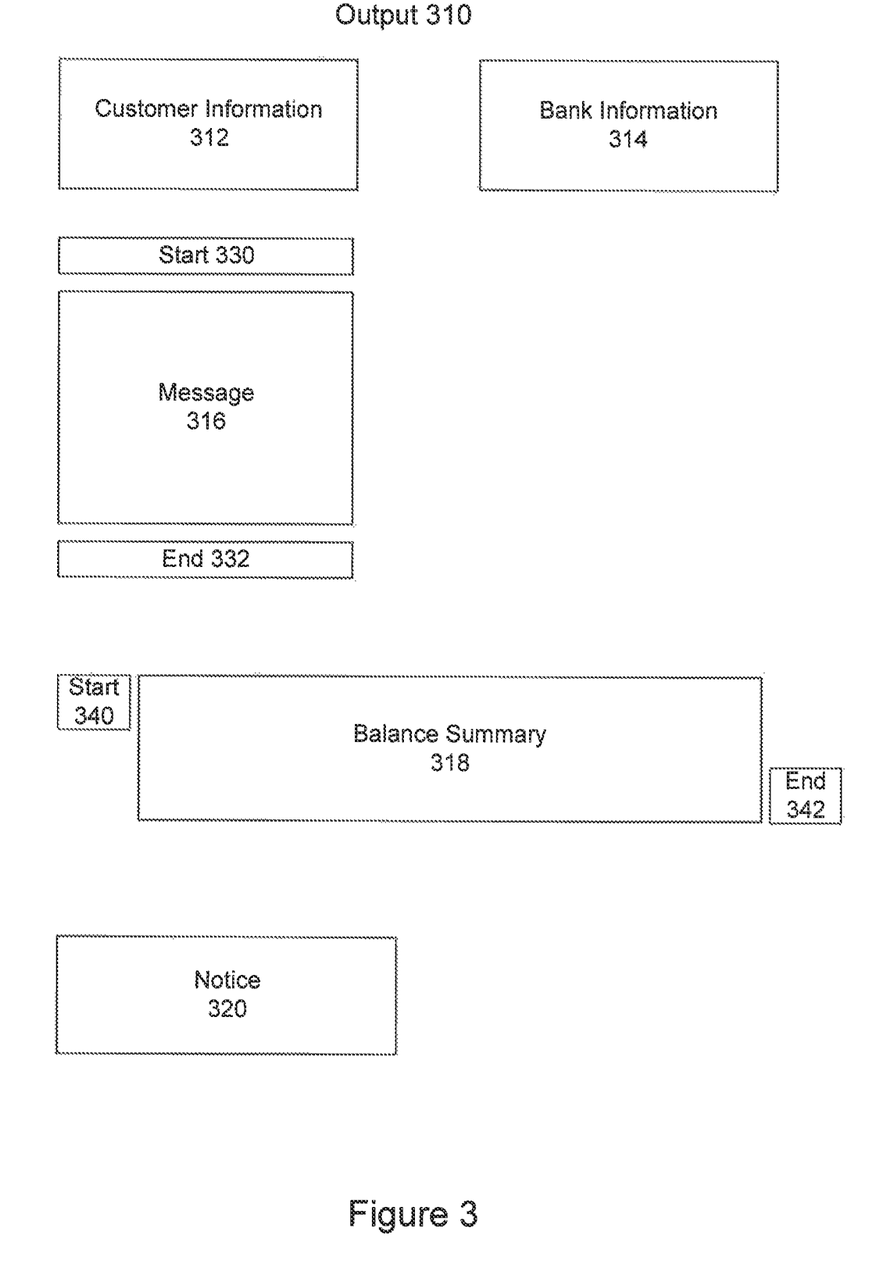
FIG. 3 illustrates an exemplary illustration, according to an embodiment of the present invention.

FIG. 3 is an exemplary statement, according to an embodiment of the present invention. FIG. 3 illustrates an exemplary non-limiting output for illustrative purposes only. For example, FIG. 3 may represent an output 310 that includes various sections. Output 310 may represent a statement as well as other documents, notices, etc. Sections may include Customer Information 312 and Bank Information 314. Statement 310 may also include a Message Section 316 and a Balance Summary 318 as well as other portions represented by Notice 320. In this example, a hidden text or marker may be added to identify a Message section 316. A start indicator 330 and an end indicator 332 may be added. In a similar manner, a start indicator 340 and an end indicator 342 may be added to Balance Summary 318. Text and/or markers may be applied in various formats, as shown in FIG. 3. Start 330 and End 332 are shown before and after Section 316, respectively. According to another example, Start indicator 340 and End indicator 342 may be applied inline with Balance Summary Section 318. Other variations may be applied.

As shown in FIG. 3, the start and end tags (e.g., "*start*" and "*end*") are visible, but in embodiments, would be in, for example, white color and have a small (e.g., approximately 1 point) font. Thus, these tags are not visible when printed or displayed. The software that reads this file, however, may read those tags.

The illustrations of FIGS. 2 and 3 are merely exemplary and may represent various financial as well as non-financial document formats.

Figure 4:
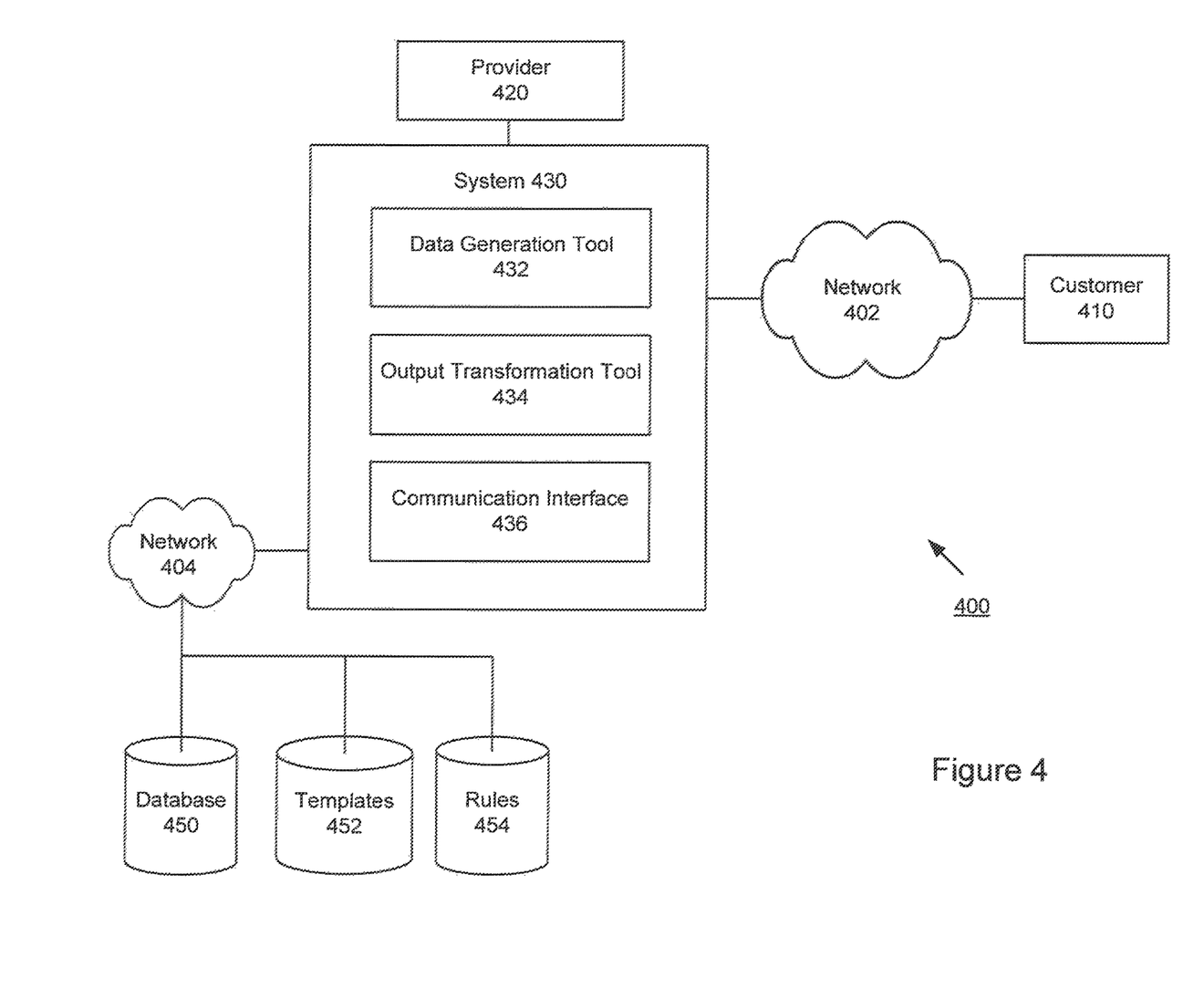
FIG. 4 illustrates a system that implements data format conversion, according to an embodiment of the present invention.

FIG. 4 illustrates a system that implements data format conversion, according to an embodiment of the present invention. As shown in FIG. 4, System 430 includes processing components, modules and functions. According to an exemplary implementation, System 430 may include Data Generation Tool 432, Output Transformation Tool 434 and Communication Interface 436 and various networking and communication components. Data Generation Tool 432 may represent a document management tool that creates, manages and delivers electronic and print deliverables. Output Transformation Tool 434 may represent a document transformation tool that repurposes and transforms documents from traditional print streams, such as AFP, Metacode, line data, image to various output formats including PDF UA, etc. Other functions and services may be supported. Communication Interface 436 may transmit an output format to a requesting entity, customer, end user and/or other recipient. The communication may be performed in real-time. The communication may be in a particular output format, link to a document, etc. The components illustrated in FIG. 4 are merely exemplary, other devices may be represented in various applications. While a single component is illustrated, each component may represent multiple components. For example, Data Generation Tool 432 and Output Transformation Tool 434 may be separate tools. According to another example, Data Generation Tool 432 and Output Transformation Tool 334 may be part of separate functions of a single tool.

According to an embodiment of the present invention, Data Generation Tool 432 may add text or markers in hidden format to the data that may be stored and managed. An embodiment of the present invention may apply rules to the data to add hidden text or markers. The rules may be application specific and/or otherwise customized to a particular application or system. Output Transformation Tool 434 may manage data for multiple output formats. For example, Output Transformation Tool 434 may access and/or retrieve data in response to a request, e.g., statement request. Output Transformation Tool 434 may apply formatting to the data based on the detected hidden text. One or more rules may be applied to the format the data. An embodiment of the present invention may remove the hidden text or makers or otherwise obscure the text or markers so they are not detectable. Communication Interface 436 may then transmit the output to a recipient in the proper format.

System 430 may be hosted by a financial institution or other entity. According to another example, System 430 may be supported by a third party service provider 420. Other scenarios and architectures may be implemented.

System 430 may store and access data from various database components, including Database 450, 452 and 454. For example, statement data may be stored and managed in Database 450. Templates may be stored at 452 and Formatting Rules may be stored at 454.

Databases may be internal or external to System 430. Data may be stored and managed in storage components, represented by Database 450, via Network 404. System 430 may be communicatively coupled to Databases, represented by 450, 452, 454. Databases may include any suitable data structure to maintain the information and allow access and retrieval of the information. The storage may be local, remote, or a combination thereof with respect to Databases. Communications with Databases may be over a network, or communications may involve a direct connection between Databases and System 430, as depicted in FIG. 4. Databases may also represent cloud or other network based storage.

Network 402 may be communicatively coupled with various components in a network. Customers 410 may represent various types of users, including customers, as well as other requesting entities. For example, Customer 410 may request data from System 430, via Network 402. System 430 may communicate with various users and customers, represented by 410, using any mobile or computing device, such as a laptop computer, a personal digital assistant, a smartphone, a smartwatch, smart glasses, other wearables or other computing devices capable of sending or receiving network signals.

The system 400 of FIG. 4 may be implemented in a variety of ways. Architecture within system 400 may be implemented as hardware components (e.g., module) within one or more network elements. It should also be appreciated that architecture within system 300 may be implemented in computer executable software (e.g., on a tangible, non-transitory computer-readable medium) located within one or more network elements. Module functionality of architecture within system 300 may be located on a single device or distributed across a plurality of devices including one or more centralized servers and one or more mobile units or end user devices. The architecture depicted in system 300 is meant to be exemplary and non-limiting. For example, while connections and relationships between the elements of system 300 are depicted, it should be appreciated that other connections and relationships are possible. The system 300 described below may be used to implement the various methods herein, by way of example. Various elements of the system 300 may be referenced in explaining the exemplary methods described herein.

Network 402, 404 may be a wireless network, a wired network or any combination of wireless network and wired network. Although Network 402, 404 is depicted as one network for simplicity, it should be appreciated that according to one or more embodiments, Network 402, 404 may comprise a plurality of interconnected networks, such as, for example, a service provider network, the Internet, a cellular network, corporate networks, or even home networks, or any of the types of networks mentioned above. Data may be transmitted and received via Network 402, 404 utilizing a standard networking protocol or a standard telecommunications protocol.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, e.g., the software, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A system that implements conversion of advance function presentation format to a portable document format, the system comprising:
   a memory that stores and manages customer data;
   a communication interface that communicates with a requestor; and
   a computer processor, coupled to the memory and communication interface, configured to perform:
   generating data in a structured data format;
   adding one or more sets of text markers in a hidden format, wherein each set of text markers comprise a start marker and an end marker that identifies a section and the hidden format comprises text in font size that is 1 point font;
   storing the data with the one or more set of text markers;
   receiving a request for data in an output format;
   converting the stored data into the output format by identifying the one or more sets of text makers for generating the output format; and
   transmitting, via the communication interface, the output format to the requestor in real-time.

2. The system of claim 1, wherein the hidden format further comprises text in substantially the same color as a background color.

3. The system of claim 1, wherein the computer processor is further configured to perform:
   removing the one or more sets of text makers prior to transmitting, via the communication interface, the output format to the requestor in real-time.

4. The system of claim 1, wherein the output format comprises a financial document format.

5. The system of claim 1, wherein the output format comprises a non-financial document format.

6. The system of claim 1, wherein the converting the stored data into the output format by identifying the one or more sets of text makers for generating the output format is further based on one or more formatting rules.

7. The system of claim 6, wherein the one or more formatting rules comprise one or more of number of columns, orientation, text color, text size and type of graphics.

8. The system of claim 1, wherein the memory comprises an archival storage.

9. The system of claim 1, wherein the output format comprises one of a plurality of output formats.

10. A method that implements conversion of advance function presentation format to a portable document format, the method comprising:
    generating data in a structured data format;
    adding one or more sets of text markers in a hidden format, wherein each set of text markers comprise a start marker and an end marker that identifies a section and the hidden format comprises text in font size that is 1 point font;
    storing, via a memory, the data with the one or more set of text markers;
    receiving a request for data in an output format;
    converting the stored data into the output format by identifying the one or more sets of text makers for generating the output format; and
    transmitting, via a communication interface, the output format to the requestor in real-time.

11. The method of claim 10, wherein the hidden format further comprises text in substantially the same color as a background color.

12. The method of claim 10, further comprising:
    removing the one or more sets of text makers prior to transmitting, via the communication interface, the output format to the requestor in real-time.

13. The method of claim 10, wherein the output format comprises a financial document format.

14. The method of claim 10, wherein the output format comprises a non-financial document format.

15. The method of claim 10, wherein the converting the stored data into the output format by identifying the one or more sets of text makers for generating the output format is further based on one or more formatting rules.

16. The method claim 15, wherein the one or more formatting rules comprise one or more of number of columns, orientation, text color, text size and type of graphics.

17. The method of claim 10, wherein the memory comprises an archival storage.

18. The method of claim 10, wherein the output format comprises one of a plurality of output formats.

* * * * *